Sept. 24, 1968     O. K. LARISON     3,403,253
HUMIDIOMETER HAVING FEEDBACK MEANS TO CONTROL
THE ENERGIZATION OF THE TUBE
Filed Nov. 29, 1965
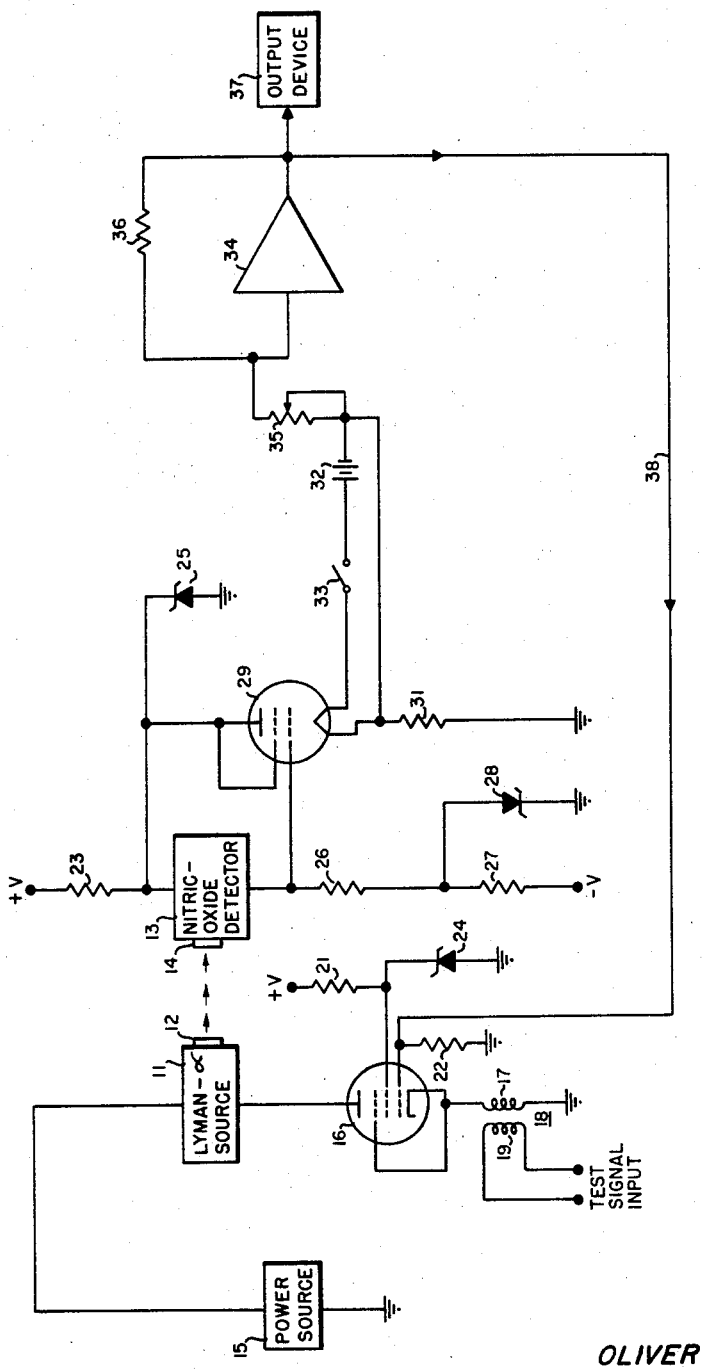
INVENTOR
OLIVER K. LARISON
BY *V.J. Di Pietro* AGENT
*R.S. Scianis* ATTORNEY

United States Patent Office 3,403,253
Patented Sept. 24, 1968

3,403,253
HUMIDIOMETER HAVING FEEDBACK MEANS TO CONTROL THE ENERGIZATION OF THE TUBE
Oliver K. Larison, Oxon Hill, Md., assignor to the United States of America as represented by the Secretary of the Navy
Filed Nov. 29, 1965, Ser. No. 510,465
3 Claims. (Cl. 250—83.3)

ABSTRACT OF THE DISCLOSURE

An improved humidiometer having a hydrogen tube for emitting Lyman-alpha radiation through an air path of fixed length to a nitric oxide detector. The output of the detector is amplified and a portion of that signal is coupled, by means of a feedback network, to a current control device coupled to the hydrogen tube for varying the output of the tube in a manner to maintain the ionization current of the detector at a constant level. A meter coupled to the amplifier produces indication of the water vapor content of the air in the radiation path.

---

The invention described herein may be manufactured and used by or for the Government of the United States of America for governmental purposes without the payment of any royalties thereon or therefor.

The present invention relates generally to humidiometers and more particularly to an improved humidiometer wherein changes in radiation through an air sample are indicative of changes in water vapor.

In the past, a Lyman-alpha humidiometer has been employed to measure the water vapor content of air, which utilizes the absorption of Lyman-alpha radiation by water vapor. The water vapor content of the air is indicated by the amount of radiation which passes through the air. In this device, a hydrogen tube of the general type disclosed in Patent No. 3,180,990 to D. L. Randall et al. issued Apr. 27, 1965, emits Lyman-alpha radiation across a sampling path to a nitric oxide detector tube acting as a radiation detector having electrical circuitry coupled thereto for producing a signal indicative of the ionization current of the nitric oxide tube. The amount of ionization current generated by the nitric oxide tube is proportional to the amount of radiation impinging on the detector. In the prior humidiometers, the Lyman-alpha radiation intensity of the source was held at a given level by maintaining a constant quantity of ionizing current through the source tube. The change in water vapor content of the air passing in the sampling path between the source and the detector varies the attenuation of the radiation detected at the nitric oxide detector. A signal proportional to the detected radiation was amplified and a meter was employed to produce a signal indicative of the water vapor content of the air traversing the sampling path. The prior humidiometers served their purpose but did not provide the desired accuracy over a relatively wide range and did not provide a suitable speed of response to changes in water vapor. The response was also nonlinear to a great extent.

The general purpose of this invention is to provide a Lyman-alpha humidiometer which embraces all the advantages of prior humidiometers and which possesses none of their disadvantages. In order to attain this, the present invention contemplates an improved humidiometer having current control means for controlling the Lyman-alpha radiation emitted by a hydrogen tube by regulating the current through the hydrogen tube by means of a feedback network coupled to the current control means. The amount of radiation emitted by the hydrogen tube is thereby regulated by a signal of appropriate polarity and amplitude to maintain a constant radiation impinging upon the radiation detector. By means of the feedback control, the ionization current of the nitric oxide detector is maintained at a constant level so that any changes in water vapor are readily detected. An electrometer tube is employed to sense the changes in ionization current of the nitric oxide detector and an operational amplifier is coupled to the electrometer tube or other suitable impedance transformation means to produce a signal of proper gain and polarity for controlling the current control device coupled to the hydrogen tube. An output device such as a meter is coupled to the operational amplifier to produce an indication of changes in the radiation impinging upon the nitric oxide detector. These changes are therefore proportional to the changes in the water vapor of the air passing in the radiation path between the source and detector. By means of the feedback network, humidity measurements may be made over a much greater range and the speed of response is greatly increased. The response to changes in humidity is also more linear.

It is therefore an object of the present invention to provide an improved humidiometer for measuring changes in the water vapor of air.

Another object is to provide an improved humidiometer which allows humidity measurements over a wider range than prior humidiometers and which increases the speed of response in measuring water vapor.

A further object of the invention is to provide an improved humidiometer wherein the response to changes in water vapor is substantially linear.

Still another object of this invention is to provide an improved Lyman-alpha humidiometer wherein the signal produced by a radiation detector is maintained substantially constant.

Other objects and many of the attendant advantages of this invention will be readily appreciated as the same becomes better understood by reference to the following detailed description when considered in connection with the accompanying drawing and wherein:

The figure is a schematic diagram of the improved humidiometer of this invention.

Referring now to the drawing, there is shown a humidiometer having a Lyman-alpha radiation source 11 comprising a hydrogen tube which emits ultraviolet light of approximaetly 1216 angstroms through a lithium fluoride window 12. A nitric oxide tube 13, which is an ionization chamber filled with nitric oxide gas is a detector for the radiation emitted from the Lyman-alpha source 11 which passes across the measuring path to lithium fluoride window 14. The amount of radiation received by nitric oxide detector 13 through its lithium fluoride window 14 is a function of the amount of water vapor of the air in the measuring path which attenuates the emitted radiation from source 11.

A power source 15 provides current for suitably energizing the hydrogen tube radiation source 11 and is coupled to a first electrode (not shown) of the hydrogen tube. A pentode 16, having its anode coupled to a second electrode (not shown) of the hydrogen tube and a cathode coupled to the secondary 17 of transformer 18, acts as a variable impedance means for the current supplied to hydrogen tube 11 power source 15. Pentode 16 has its suppressor grid coupled to its cathode, and its screen grid coupled to a voltage source through a resistor 21. A Zener diode 24 is coupled with its cathode to the screen grid of the pentode 16 and its anode coupled to ground. Resistor 21 and Zener diode 24 establish a bias for the screen grid of pentode 16. The control grid of pentode 16 receives an input developed across resistor 22 for controlling the impedance of pentode 16 so that the current through radiation source 11 is regulated.

Transformer 18 has a primary 19 for receiving a test signal for testing the frequency response of the humidiometer. This is an optional feature and if it is not included transformer 18 may be eliminated and the cathode of pentode 16 may be coupled directly to ground.

Nitric oxide tube 13 has a first electrode (not shown) coupled to a positive voltage source through a resistor 23. A Zener diode 25 is coupled with its cathode to nitric oxide tube 13 and its anode coupled to ground to maintain a bias voltage for the nitric oxide tube. A second electrode (not shown) of nitric oxide tube 13 is coupled through resistors 26 and 27 to a negative voltage source. A Zener diode 28 is coupled with its anode to the junction of resistors 26 and 27 and its cathode to ground in order to establish a voltage reference for the nitric oxide detector. A conventional electrometer tube 29 monitors the ionization current of the nitric oxide detector to produce a signal proportional to the ionizing current of the nitric oxide detector. The electrometer tube is operated with its screen grid coupled to its plate which in turn is coupled to the first electrode of the nitric oxide chamber. The control grid is coupled to the second electrode of the nitric oxide chamber. The output of the electrometer tube is produced at its cathode which is coupled to ground through a resistor 31. Since the electrometer tube is a thermionic vacuum tube, an energization circuit is coupled to the cathode and comprises a battery or potential source 32 with a single pole-double throw switch 33 for energizing the filament cathode of electrometer 29 when the electrometer circuit is in operation. The output signal of the electrometer is developed across resistor 31 and is applied through potentiometer 35 to the input of operational amplifier 34. Resistor 36 is shown coupled in a conventional manner from the input to the ouput of operational amplifier 34. An output device 37, which may be any suitable device such as a meter or recorder, is coupled to the output of amplifier 34 for providing an indication of the output error signal. The signal indicated by the output device is proportional to the change in humidity as represented by the change in radiation detected by nitric oxide detector 13. The feedback circuit 38 couples the output of operational amplifier 34 to the control grid of pentode 16 in the hydrogen tube circuit. The error signal produced by operational amplifier 34 is therefore employed to control pentode 16 in order to regulate the radiation emitted by radiation source 11 in accordance with changes in the water vapor in the radiation path. The change is such that the ionization current through the nitric oxide detector is maintained at a constant level. Hence, as the water vapor increases and the radiation is proportionally attenuated so that a decreased amount of radiation impinges upon the nitric oxide detector, the error signal at the output of the operational amplifier increases, thereby controlling the impedance of pentode 16 so that the hydrogen tube of radiation source 11 conducts more heavily to emit additional radiation in proportion to the increase in water vapor.

It is to be understood that any suitable sensing device may be used in place of electrometer tube 29 in order to obtain a signal proportional to the amount of radiation impinging upon the nitric oxide detector. Likewise, any suitable amplifier for producing a desired voltage gain and phase inversion may be utilized in place of the conventional operational amplifier illustrated. In addition, any suitable variable impedance means may be utilized in place of the pentode 16.

It is also to be understood that the transformer in the cathode of the pentode 16 is strictly an optional feature and is employed solely for test purposes in order to obtain an indication of the frequency response or the speed with which the humidiometer responds to changes in water vapor in the air. The device may be tested in this manner in the absence of changing humidity in the sampling path since the signal applied to the primary 19 of transformer 18 varies the current through the hydrogen tube to produce a varying radiation. The change in radiation is thereby sensed by the circuitry coupled to the nitric oxide detector which produces a signal applied through a feedback circuit to the hydrogen tube circuit and the response of the device may thereby be determined. As mentioned above, the transformer 18 may be completely eliminated so that the cathode of tube 16 is coupled directly to ground or directly to the power source 15 to form a current loop.

It is also to be understood that the specific biasing circuit employed for the nitric oxide detector is merely illustrative and may be varied in accordance with the desired voltage potential to be maintained across the nitric oxide detector.

In operation, Lyman-alpha source 11 emits radiation which impinges directly upon the nitric oxide detector 13 through a measuring path through which air passes. The amount of radiation received by detector 13 is a function of the amount of water vapor in the air in the measuring path which absorbs a certain amount of radiation emitted by the source. For a given amount of unvarying water vapor in the air, the nitric oxide detector develops an ionization current which is constant and which is sensed by the electronic circuitry coupled thereto to produce a constant level signal through the feedback circuit coupled to the pentode circuit, which in turn controls the current flowing through the hydrogen tube. However, with any variation in water vapor, the ionization current through the detector changes because of the change in detected radiation so that an error signal is produced in the feedback circuit to the control tube which varies the current in the hydrogen tube circuit in order to compensate for the change in radiation received by the detector. If the water vapor increases so that a greater amount of radiation is attenuated and consequently a lesser amount of radiation is received by the detector, the feedback control signal causes the Lyman-alpha source to emit additional radiation so that the ionization current of the detector returns to its normal level. On the other hand, if the amount of water vapor decreases, the amount of radiation received by the detector increases because of the decreased attenuation in the measuring path. Consequently, the current through the nitric oxide detector increases and a signal is developed in the feedback circuit to control the hydrogen tube so that a lesser amount of Lyman-alpha radiation is emitted to the nitric oxide detector. In both cases the ionization current of the detector is quickly returned to its normal level. It is therefore seen that the ionization current is maintained at a constant level for a given amount of unvarying water vapor.

The operational amplifier provides a phase inversion for the signal received from the electrometer tube. Thus, if $V_i$ is the signal developed at the input of the operational amplifier, and $-A$ is the gain factor of the operational amplifier, a voltage $-AV_i$ is applied to the control tube if the water vapor changes such that the incident radiation on the detector varies the ionization current of the detector. It is therefore seen that any water vapor change in the measuring path which tends to alter the normal state of the system causes an error signal to be produced which at once is returned as a correcting signal to the hydrogen tube radiation source and is also monitored by an output device such as a meter or recorder for producing an output measure of changes in the water vapor.

Obviously, many modifications and variations in the present invention are possible in the light of the above teachings. It is to be understood that the circuitry of the humidiometer may be readily transistorized in order to produce a more compact unit. It is therefore to be understood that within the scope of the appended claims the invention may be practiced otherwise than as specifically described.

What is claimed and desired to be secured by Letters Patent of the United States is:

1. A humidiometer comprising:
   a hydrogen tube for emitting Lyman-alpha radiation,
   a single nitric oxide detector displaced from said hydrogen tube by a fixed distance for receiving radiation emitted by said tube and allowing air to pass between said tube and said detector in a radiation path, said detector producing a signal proportional to the amount of radiation impinging thereon,
   means for energizing said hydrogen tube,
   means coupled to said hydrogen tube for controlling energization of said tube,
   regulating means for receiving the signal from said detector responsive to changes in the detected radiation to regulate said means for controlling the energization of said tube in accordance with changes in the detected radiation to maintain the signal produced by said detector at a constant level,
   a feedback circuit coupling said regulating means to said means for controlling the energization of said tube, and
   output means coupled directly to said regulating means for providing an indication of a change of water vapor content in the air passing in said radiation path.

2. A humidiometer as set forth in claim 1 wherein:
   said means for energizing the hydrogen tube comprises a power source for supplying current to said hydrogen tube, and
   said means for controlling the energization of said hydrogen tube comprises a variable impedance means coupled in the current path between the power source and the hydrogen tube.

3. A humidiometer as set forth in claim 2 wherein:
   said variable impedance means comprises a pentode having its anode coupled to the hydrogen tube and its cathode coupled to ground.

References Cited
UNITED STATES PATENTS

| | | | |
|---|---|---|---|
| 3,171,962 | 3/1965 | Ballinger | 250—83.3 |
| 3,173,004 | 3/1965 | McKenzie | 250—43.5 |
| 3,180,984 | 4/1965 | Fertig et al. | 250—43.5 |
| 3,180,990 | 4/1965 | Randall et al. | |

RALPH G. NILSON, *Primary Examiner.*

S. ELBAUM, *Assistant Examiner.*